(12) United States Patent
Fukuda et al.

(10) Patent No.: US 9,939,337 B2
(45) Date of Patent: *Apr. 10, 2018

(54) DEFORMATION DETECTION SENSOR AND PRODUCTION OF THE SAME

(71) Applicant: TOYO TIRE & RUBBER CO., LTD., Osaka-shi, Osaka (JP)

(72) Inventors: Takeshi Fukuda, Osaka (JP); Takuya Tsuzuki, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/131,548

(22) Filed: Apr. 18, 2016

(65) Prior Publication Data
US 2016/0305831 A1    Oct. 20, 2016

(30) Foreign Application Priority Data
Apr. 20, 2015 (JP) .................. 2015-085820

(51) Int. Cl.
*G01L 1/12*    (2006.01)
*B60N 2/00*    (2006.01)
(Continued)

(52) U.S. Cl.
CPC ............. *G01L 1/12* (2013.01); *B29C 44/12* (2013.01); *B60N 2/002* (2013.01); *B60N 2/7017* (2013.01); *G01G 19/4142* (2013.01)

(58) Field of Classification Search
CPC ........ G01B 7/24; G01L 1/12; G01G 19/4142; B29C 44/12; B60N 2/002; B60N 2/00;
(Continued)

(56) References Cited

U.S. PATENT DOCUMENTS

| 4,111,865 A * | 9/1978 | Seefried, Jr. .......... C08F 283/06 521/137 |
| 7,663,362 B2 * | 2/2010 | Kishida .................. G01R 33/04 324/244 |

(Continued)

FOREIGN PATENT DOCUMENTS

| EP | 1 521 071 A2 | 4/2005 |
| EP | 1 521 071 A3 | 8/2005 |

(Continued)

OTHER PUBLICATIONS

Search Report dated Sep. 26, 2016, issued in counterpart European Application No. 16164151.9 (9 pages).

(Continued)

*Primary Examiner* — Harshad R Patel
*Assistant Examiner* — Octavia Hollington
(74) *Attorney, Agent, or Firm* — Westerman, Hattori, Daniels & Adrian, LLP

(57) ABSTRACT

A deformation detection sensor which combines a magnetic resin dispersing a magnetic filler in a resin with a magnetic sensor, of which stability of detection property is highly enhanced. The deformation detection sensor comprises a magnetic resin-containing polymer foam which comprises a magnetic resin, in which a magnetic filler is contained, and a polymer foam in which the magnetic resin is included, and a magnetic sensor that detects a magnetic change caused by a deformation of the magnetic resin-containing polymer foam, wherein the magnetic resin has an elastic modulus of 0.1 to 10 MPa, and a production thereof.

12 Claims, 2 Drawing Sheets

(51) Int. Cl.
*B29C 44/12* (2006.01)
*B60N 2/70* (2006.01)
*G01G 19/414* (2006.01)

(58) Field of Classification Search
CPC ......... B60N 2/7017; B60R 22/48; H01F 1/42; G01R 33/09; H01M 10/48
USPC .............................................. 73/862.69, 779
See application file for complete search history.

(56) References Cited

U.S. PATENT DOCUMENTS

| | | | | |
|---|---|---|---|---|
| 8,237,324 | B2 * | 8/2012 | Pei | .......... H01L 41/094 310/306 |
| 8,623,265 | B2 * | 1/2014 | Simpson | ................ C08J 9/0066 264/440 |
| 9,372,243 | B2 * | 6/2016 | Wada | ................... G01R 33/091 |
| 2008/0036456 | A1 | 2/2008 | Kishida et al. | |
| 2010/0295563 | A1 * | 11/2010 | Bieck | ..................... B60N 2/002 324/679 |
| 2015/0338291 | A1 | 11/2015 | Shigeto et al. | |
| 2016/0305760 | A1 * | 10/2016 | Fukuda | ................... B29C 44/12 |

FOREIGN PATENT DOCUMENTS

| | | |
|---|---|---|
| JP | 2006-14756 | 1/2006 |
| JP | 2007-212196 A | 8/2007 |
| JP | 2011-183686 A | 9/2011 |
| JP | 2011-255743 A | 12/2011 |
| JP | 2012-108113 A | 6/2012 |
| WO | 2011/029575 A1 | 3/2011 |

OTHER PUBLICATIONS

Extended European Search Report dated Sep. 27, 2016, issued in European Application No. 16164141.0. (9 pages).
Non-Final Office Action dated Mar. 27, 2017, issued in U.S. Appl. No. 15/132,784. (20 pages).
Final Office Action dated Oct. 5, 2017, issued in U.S. Appl. No. 15/132,784 (16 pages).

* cited by examiner

[Fig. 1]
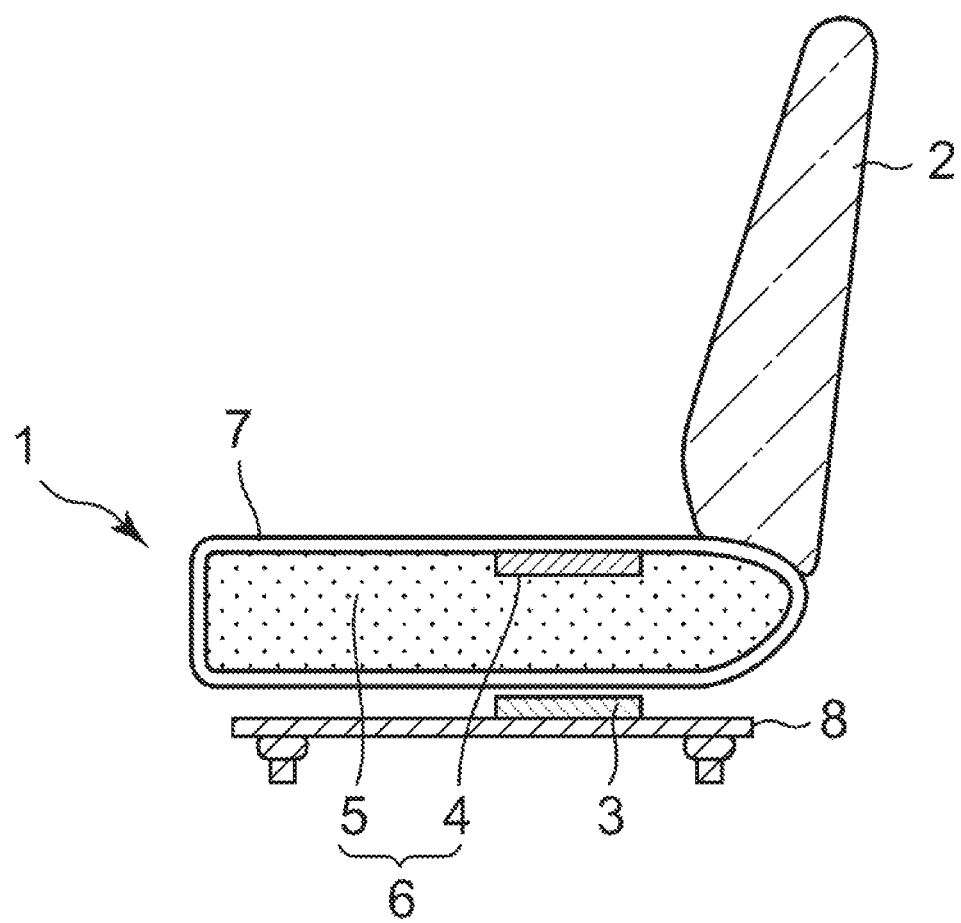

[Fig. 2]
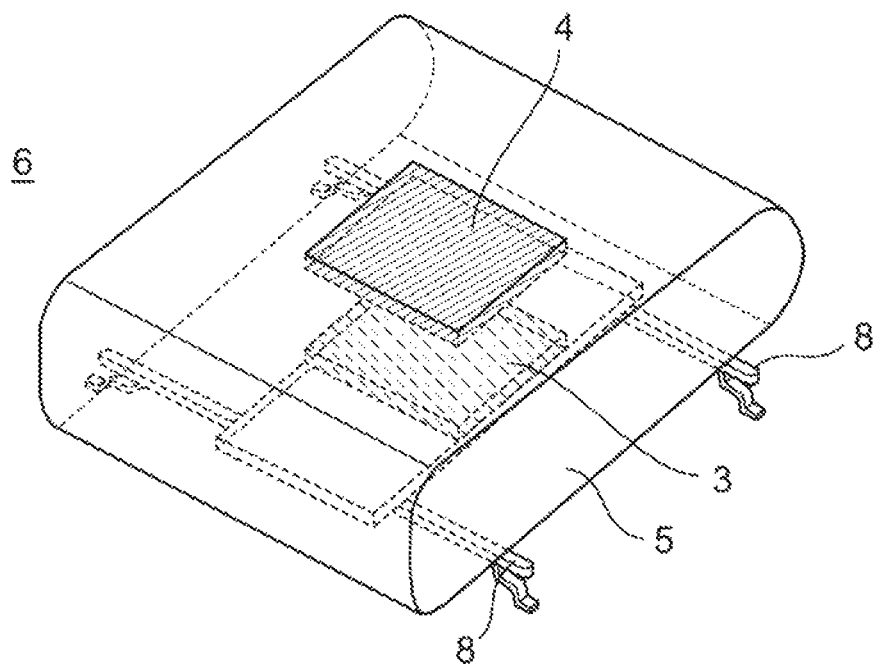

DEFORMATION DETECTION SENSOR AND PRODUCTION OF THE SAME

FIELD OF THE INVENTION

The present invention is related to a deformation detection sensor, in particular a deformation detection sensor used for a car seat, and a production method thereof.

BACKGROUND OF THE INVENTION

There has been practically used a warning system which detects whether a person is sit on a seat in a vehicle, such as an automobile and then alerts if the person does not couple a seat belt. The warning system generally gives off an alert when it detects the sitting of the person and simultaneously detects not coupling the seat belt. The apparatus generally comprises a sitting sensor which detects whether a person is sitting on a seat and a sensor which detects not coupling the seat belt with a buckle although the person is seated, which gives off an alert when the uncoupling of the seat belt, is detected. The sitting sensor necessitates high durability because it must detect a person sitting down many times. It is also necessary that, when a person is seated, the person does not feel the sensation of any foreign object in the seat.

JP 2012-108113 A (Patent Document 1) discloses a sitting sensor equipped in a seat, detecting the sitting of a person, which comprises electrodes facing with each other in a cushion material and detects an electric contact of the electrodes. This sensor employs an electrode and should equip wiring. The wiring can be disconnected by receiving a large displacement and gives some problems in durability. In addition, the electrode is generally made of metallic substance which may create a sensation of a foreign object. Even if the electrode is not metallic, the feeling of a foreign object would easily generate based on the other substances.

JP 2011-255743 A (Patent Document 2) discloses an electrostatic capacitance-type sitting sensor which comprises sensor electrodes facing with each other, between which dielectric substance is inserted, and an electrostatic capacitance-type sensor that measures an electrostatic capacity between the electrodes. This sensor also employs electrodes and should equip wiring, which gives rise to durability problems as same with Patent Document 1. It, is also difficult to prevent a sensation of a foreign object.

JP 2007-212196 A (Patent Document 3) discloses a load detection device for a vehicle seat, which comprises a magnetism generator equipped with a displaceable flexible element and a magnetic sensor, equipped with a fixing element of a flame, having a magnetic impedance element that detects a magnetic field generated by the magnetism generator. Since the magnetism generator includes a magnet having a specified size in this device, it is quite difficult to dispose the magnetism generator near a surface of a cushion material without any foreign object sensation. In order to avoid the foreign object sensation, it is considered that the magnetism generator is disposed inside the cushion material, but this leads to the deterioration of detection accuracy.

JP 2006-014756 A (Patent Document 4 discloses a bio-signal detection device which comprises a permanent magnet and a magnetic sensor. Since the device also employs the permanent magnet which would give a foreign object sensation, it is difficult to place the device near a surface of the cushion material. The displacement of the device inside the cushion material leads to the deterioration of detection accuracy.

SUMMARY OF THE INVENTION

The present inventors have already proposed a deformation detection sensor wherein a magnetic resin, in which magnetic filler is dispersed in a resin, is employed and is combined with a magnetic sensor, in order to enhance the durability of the deformation detection sensor and to obtain a seat which does not provide any foreign object sensation, but it is further desired to enhance the stability of detection properties. As the results of the intense study, the present inventors have found that, by controlling an elastic modulus of the magnetic resin, the stability of the sensor is enhanced without foreign object sensation, thus the present invention having been accomplished.

Accordingly, the present invention provides a deformation detection sensor which comprises:

a magnetic resin-containing polymer foam which comprises a magnetic resin, in which a magnetic filler is contained, and a polymer foam in which the magnetic resin is included, and a magnetic sensor that detects a magnetic change caused by a deformation of the magnetic resin-containing polymer foam, wherein the magnetic resin has an elastic modulus of 0.1 to 10 MPa.

The present invention also provides a method for producing a deformation detection sensor, comprising the steps of:

a step of dispersing a magnetic filler in a polyurethane resin precursor comprising a mono-ol component, a step of curing the resin precursor to form a magnetic resin having an elastic modulus of 0.1 to 1.0 MPa, a step of placing the magnetic resin in a mold for a polymer foam, a step of pouring a polyurethane raw material of the polymer foam into the mold to foam, whereby the magnetic resin is integrated with the polymer foam, and a step of combining the magnetic resin-containing polymer foam with a magnetic sensor that detects a magnetic change caused by a deformation of the magnetic resin-containing polymer foam.

It is preferred that an average cell diameter of cells of the polymer foam in the vicinity of an interface between the magnetic resin and the polymer foam is larger than that of cells of a center portion of the polymer foam.

It is also preferred that the magnetic resin and the polymer foam are made of polyurethane.

It is further preferred that the polyurethane which forms the magnetic resin comprises a mono-ol component.

It is more preferred that the mono-ol component is a high polar mono-ol.

It is further more preferred that the mono-ol component is contained in an amount of 0.1 to 1.0 meq/g in the total of the polyurethane raw material.

It is preferred that the magnetic resin and the polymer foam are adhered by self-adhesion.

It is also preferred that the magnetic resin-containing polymer foam is a cushion pad for a vehicle and the deformation to be detected occurs by a sitting of a person.

According to the present invention, the magnetic resin highly follows the deformation (especially, bending deformation) of the polymer foam, by controlling an elastic modulus within the range of 0.1 to 10 MPa, thus enhancing the stability of the detection properties.

Since the magnetic filler is dispersed in the resin for the magnetic resin of the present invention, it can hardly provide a foreign object sensation and shows comfortable to sit in when it is used for a seat in a vehicle, in comparison with that using a solid magnetic. In addition, as the magnetic sensor detects a magnetic change caused by the magnetic filler contained in the magnetic resin, the magnetic sensor can be disposed separately with a certain distance apart from the magnetic resin and can be placed without, wiring to connect with an electrode, which does not show any problems, such as cutting wire or poor durability. Further, since wiring to connect with an electrode is not necessary, it is not necessary to place any foreign object in the polymer foam and a production of the deformation detection sensor would become easily.

BRIEF DESCRIPTION OF THE DRAWINGS

FIG. 1 is a schematic sectional view which shows an embodiment that the deformation detection sensor of the present invention is applied to a seat for a vehicle.

FIG. 2 shows a schematic perspective view of the magnetic resin-containing polymer foam of the present invention.

DETAILED DESCRIPTION OF THE PREFERRED EMBODIMENTS

The present invention will be explained in detail by referring the drawings.

FIG. 1 is a schematic sectional view which shows an embodiment that the deformation detection sensor of the present invention is applied to a seat for a vehicle.

FIG. 2 shows a schematic perspective view of the magnetic resin-containing polymer foam of the present invention.

As shown in FIG. 1, the deformation detection sensor of the present invention is basically composed of a sitting portion 1 and a magnetic sensor 3. When the deformation detection sensor is used for a seat for a vehicle, a backrest portion 2 is present in contact with an end portion of the sitting portion 1. The sitting portion 1 is composed of a magnetic resin-containing polymer foam 6 which comprises a magnetic resin 4 and a polymer foam 5; and an outer skin 7 covering the magnetic resin-containing polymer foam 6. The magnetic resin 4 is disposed in layer in a portion of the sitting surface in the polymer foam 5. It is preferred that the magnetic sensor 3 is fixed to a pedestal 8 supporting the seat for a vehicle. The pedestal 8 is fixed to a car body in the case of a car, which is not shown in the figures.

FIG. 2 shows a perspective view of the magnetic resin-containing polymer foam 6 of the present invention, which is composed of the magnetic resin 4 and the polymer foam 5, and it further shows the pedestal 8 and the magnetic sensor 3 mounting on the pedestal 8. The magnetic resin 4 is disposed on an uppermost portion of the polymer foam, which can highly receive the deformation when a person is sitting on the seat. FIG. 3 does not show the outer skin 7 which is present on the magnetic resin-containing polymer foam 6. The outer skin 7 is generally made of leather, fabric, synthetic resin or the like, which is not limited thereto.

The magnetic resin 4 contains a magnetic filler dispersed therein, which has magnetism by way of a magnetization method or another method. When a person sits on the sitting portion 1, the magnetic resin-containing polymer foam 6 is deformed and the magnetic field is changed thereby. The change of the magnetic field is detected by the magnetic sensor 3 to inspect the person sitting on the seat. In FIGS. 1 and 2, the polymer foam 6 which contains the magnetic resin 4 is present near the buttock of the person and, when the person is sitting, the sensor inspects it and, for example, when the person does not wear a seat belt, it alerts to the person. In addition, the magnetic resin-containing polymer foam 6 may be used as a backrest which contacts a backside of a person. When the polymer foam 6 is used as a backrest, the magnetic sensor can detect, a posture of the sitting person.

In the present invention, it is preferred that the magnetic resin 4 has an elastic modulus of 0.1 to 10 MPa. The elastic moduli of less than 0.1 MPa deteriorate the handling performance and reduce the stability of properties, as well as those of more than 10 MPa reduce the detection accuracy of the sensor. The elastic modulus may preferably be 0.15 to 3 MPa. The elastic modulus can be determined by JIS K-7312. Particularly, it is determined using Autograph AG-X (available from Shimadzu Corporation) More detailed measuring conditions are described in working examples of the present invention.

A method of controlling an elastic modulus of the magnetic resin 4 is known to the art and can be carried out by many methods. For example, it can be done by either reducing a molecular weight of a resin forming the magnetic resin, or by reducing an amount of a crosslinking agent of the magnetic resin. This method will be explained in detail when ingredients and production methods of the magnetic resin are explained.

It is preferred that the magnetic resin 4 has a thickness of 0.5 to 20 mm, preferably 1.0 to 5.0 mm. Thicknesses of less than 0.5 mm lower an amount of the magnetic filler and deteriorate the detection accuracy of the sensor and those of more than 20 mm have a tendency to provide a foreign object sensation given by the magnetic resin to the person sitting.

Magnetic Resin

The term "magnetic resin" employed in the present specification means a resin in which a magnetic filler (an inorganic filler having magnetism) is dispersed.

The magnetic filler generally includes rare earth-based, iron-based, cobalt based, nickel-based or oxide-based filler, which can be used in the present invention. The rare earth-based magnetic filler is preferred because it shows high magnetism, but is not limited thereto. Neodymium-based magnetic filler is more preferred. A shape of the magnetic filler is not limited, but includes spherical, flake, needle, columnar or indefinite shape. The magnetic filler may preferably have an average particle size of 0.02 to 500 µm, preferably 0.1 to 400 µm, more preferably 0.5 to 300 µm. If it has an average particle size of less than 0.02 µm, the magnetic properties of the magnetic filler become poor and if it has an average particle size of more than 500 µm, the mechanical properties (e.g. brittleness) of the magnetic resin become poor.

The magnetic filler may be introduced into the resin after it is magnetized, but it is preferred that the magnetic filler is magnetized after it is introduced into the resin, because the polarity of the magnetic filler can be easily controlled and the detection of magnetism can be easily carried out.

The resin for the magnetic resin can be general resin, but preferably includes thermoplastic elastomer, thermosetting elastomer or a mixture thereof. Examples of the thermoplastic elastomers are styrene based thermoplastic elastomer, polyolefin based thermoplastic elastomer, polyurethane based thermoplastic elastomer, polyester based thermoplastic elastomer, polyamide based thermoplastic elastomer, polybutadiene based thermoplastic elastomer, polyisoprene based thermoplastic elastomer, fluororubber based thermoplastic elastomer and the like. Examples of the thermosetting elastomer are diene based synthetic rubber, such as polyisoprene rubber, polybutadiene rubber, styrene-butadiene rubber, polychloroprene rubber, nitrile rubber, and ethylene-propylene rubber; non-diene based synthetic rubber, such as ethylene-propylene rubber, butyl rubber, acryl rubber, polyurethane rubber, fluororubber, silicone rubber, and epichlorohydrin rubber; natural rubber; and the like. Among them, thermosetting elastomer is preferred, because it can be used in a long period of time during which damage or fatigue of the magnetic resin can be inhibited. More preferred is polyurethane elastomer (also mentioned herein as polyurethane rubber) or silicone elastomer (also mentioned herein as silicone rubber).

The resin can preferably be polyurethane elastomer or silicone elastomer. In the case of polyurethane elastomer, an active hydrogen-containing compound is mixed with a magnetic filler, into which an isocyanate component is added and mixed to form a mixture solution. In addition, polyurethane elastomer can also be prepared by mixing an isocyanate component with a magnetic filler, into which an active hydrogen-containing compound is added and mixed to form a mixture solution. The resulting mixture solution is poured in a mold which has been treated with a releasing agent, and then heated to a curing temperature to cure, thus obtaining a polyurethane elastomer. In the case of silicone elastomer, a precursor of silicone elastomer is combined with a magnetic filler and mixed, followed by heating it to cure, thus obtaining a silicone elastomer. When forming the mixture solution, a solvent, may be added thereto, if necessary.

The isocyanate component and the active hydrogen-containing component to be employed for the polyurethane elastomer are listed hereinafter. According to the present invention, as mentioned above, since an elastic modulus of the magnetic resin is controlled to be low, a mono-ol may be formulated as a portion of the active hydrogen-containing component. The elastic modulus may also be controlled by adjusting NCO index, without using the mono-ol component.

The isocyanate component is not limited and can be anyone that has been employed in the field of polyurethane. Examples of the isocyanate components are an aromatic diisocyanate, such as 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, 1,5-naphthalene diisocyanate, p-phenylene diisocyanate, m-phenylene diisocyanate, p-xylylene diisocyanate, and m-xylylene diisocyanate; an aliphatic diisocyanate, such as ethylene diisocyanate, 2,2,4-trimethylhexamethylene diisocyanate, and 1,6-hexamethylene diisocyanate; an alicyclic diisocyanate, such as 1,4-cyclohexane diisocyanate, 4,4'-dicyclohexylmethane diisocyanate, isophorone diisocyanate, and norbornane diisocyanate. The compounds can be used alone or in combination of two or more compounds thereof. In addition, the isocyanate can be modified by urethane modification, allophanate modification, biuret modification, isocyanurate modification or the like.

The active hydrogen-containing compound can be anyone that has been employed in the field of polyurethane. Examples of the active hydrogen-containing compounds are a polyether polyol, such as polytetramethylene glycol, polypropylene glycol, polyethylene glycol and a copolymer of polypropylene oxide and polyethylene oxide; a polyester polyol, such as polybutylene adipate, polyethylene adipate, and 3-methyl-1,5-pentane adipate; a polyester polycarbonate polyol, such as a reaction product of a polyester glycol (e.g. polycaprolactone polyol and polycaprolactone) and an alkylene carbonate; a polyester polycarbonate polyol obtained by reacting ethylene carbonate with a polyhydric alcohol to form a reaction mixture, followed by reacting the reaction mixture with an organic dicarboxylic acid; a polycarbonate polyol obtained by ester-exchange reacting a polyhydroxyl compound with an aryl carbonate; and the like. The active hydrogen-containing compounds can be used alone or a combination of two or more compounds thereof.

In addition to the above-mentioned high molecular weight polyol component, the active hydrogen-containing component can also include a low molecular weight polyol, such as ethylene glycol, 1,2-propylene glycol, 1,3-propylene glycol, 1,4-butanediol, 1,6-hexanediol, neopentyl glycol, 1,4-cyclohexane dimethanol, 3-methyl-1,5-pentanediol, diethylene glycol, triethylene glycol, 1,4-bis(2-hydroxyethoxy)benzene, trimethylolpropane, glycerin, 1,2,6-hexane triol, pentaerythritol, tetramethylol cyclohexane, methyl glucoside, sorbitol, mannitol, dulcitol, sucrose, 2,2,6,6-tetrakis(hydroxymethyl)cyclohexanol, and triethanolamine; and a low molecular weight polyamine, such as ethylenediamine, tolylenediamine, diphenylmethanediamine, diethylenetriamine and the like. These compounds can be used alone or a combination of two or more compounds thereof. A polyamine, including 4,4"-methylenebis(o-chloroaniline) (MOCA), 2,6-dichloro-p-phenyienediamine, 4,4'-methylenebis(2,3-dichloroaniline), 3,5-bis(methylthio)-2,4-toluenediamine, 3,5-bis(methylthio)-2,6-toluenediamine, 3,5-dimethyltoluene-2,4-diamine, 3,5-diethyltoluene-2,6-diamine, triethyleneglycol-di-p-aminobenzoate, polytetramethyleneoxide-di-p-aminobenzoate, 1,2-bis(2-aminophenylthio)ethane, 4,4'-diamino-3,3'-diethyl-5,5'-dimethyldiphenylmethane, N,N'-di-sec-butyl-4,4'-diaminodiphenylmethane, 4,4'-diamino-3,3'-diethyldiphenylmethane, 4,4'-diamino-3,3'-diethyl-5,5'-dimethyldiphenylmethane, 4,4'-diamino-3,3'-diisopropyl-5,5'-dimethyldiphenylmethane, 4,4'-diamino-3,3',5,5-tetraethyldiphenylmethane, m-xylylenediamine, N,N'-di-sec-butyl-p-phenylenediamine, m-phenylenediamine, p-xylylenediamine; and the like, may also be added thereto.

The mono-ol component used for controlling elastic modulus can be anyone that has been known to the art in the field of polyurethane, but a high polar mono-ol having a high polar group (such as a nitrile group, a nitro group or the like) can be preferably employed. If the mono-ol component has high polar group, the high polar group would adsorb water which causes water foaming when producing the polymer foam and an average cell diameter of the cells of the polymer foam near the magnetic resin would be larger than those of a center portion of the polymer foam, Examples of the high polar mono-ol compounds are ethylene cyanohydrin (2-cyanoethyl alcohol), 2-hydroxybutyronitrile, 2-hydroxyisobutyronitrile, 3-hydroxybutyronitrile, 3-hydroxyglutaronitrile, 3-hydroxy-3-phenylpropionitrile, o-cyanobenzyl alcohol, m-cyanobenzyl alcohol, p-cyanobenzyl alcohol, 4-(2-hydroxyethyl)benzonitrile, 2-nitroethanol, 2-methyl-2-nitro-1-propanol, 3-nitro-2-butanol, 3-nitro-2-pentanol, o-nitrobenzyl alcohol, m-nitrobenzyl alcohol, p-nitrobenzyl alcohol, 2-methyl-3-nitrobenzyl alcohol, 3-methyl-2-nitrobenzyl alcohol, 3-methyl-4-nitrobenzyl alcohol, 4-methyl-3-nitrobenzyl alcohol, 5-methyl-2-nitrobenzyl alcohol, 3-methoxy-4-nitrobenzyl alcohol, 4,5-dimethoxy-2-nitrobenzyl alcohol, 4-methoxy-3-nitrobenzyl alcohol, 5-hydroxy-2-nitrobenzyl alcohol, 4-hydroxy-3-nitrobenzyl alcohol, 2-(4-nitrophenyl)ethanol and the like.

The mono-ol component can be another one which is different from the high polar mono-ol component mentioned above. The other mono-ol component to be employed can be a mono-alcohol which has been known to the art, for example simple alcohol, such as methanol, ethanol, n-propyl alcohol and isopropyl alcohol; or a (poly)alkyleneglycol monoalkyl ether having the following general formula (1):

$$R_1-(OCH_2CHR_2)_n-OH \quad (1)$$

(wherein $R_1$ shows a methyl group, an ethyl group, a propyl group, a butyl group, an aryl group and a substituted aryl group, and $R_2$ shows a hydrogen atom or a methyl group, n is an integer of 1 to 5.) for example diethyleneglycol monoethyl ether, diethyleneglycol monomethyl ether, dipropyleneglycol monoethyl ether, dipropyleneglycol monomethyl ether, 2-methoxymethanol, ethyleneglycol monoethyl ether, ethyleneglycol monobutyl ether, ethyleneglycol mono-t-butyl ether, ethyleneglycol monophenyl ether, diethyleneglycol monobutyl ether, triethyleneglycol monobutyl ether and polyethyleneglycol mono-p-isooctylphenyl ether. The mono-al component can also be a carboxylic acid to which alkyleneoxide is added, for example an adduct of an alkylene oxide to a carboxylic acid (such as, acrylic acid, methacrylic acid or the like).

The mono-ol can be formulated in the polyurethane raw material in an amount of 0.1 to 1.0 meq/g, preferably 0.15 to 0.9 meq/g, based on a total amount of the polyurethane raw material. If the mono-ol component, especially high polar mono-al component is employed, the high polar group would adsorb water which causes water foaming when producing the polymer foam and an average cell diameter of the cells of the polymer foam near the magnetic resin would be larger than those of a center portion of the polymer foam. If an amount of the mono-ol component is less than 0.1 meq/g, the control of the average cell diameter near the magnetic resin in the polymer foam becomes difficult. If it is more than 1.0 meq/g, it is difficult to obtain a cured polymer foam.

An amount of the magnetic filler in the magnetic resin can preferably be 1 to 450 parts by weight, more preferably 2 to 400 parts by weight, based on 100 parts by weigh of the resin. Amounts of less than 1 part by weight make it difficult to detect magnetic changes and those of more than 450 parts by weight make the resin brittle and do not obtain the desired properties.

In the present invention, the magnetic resin can also be adhered to the polymer foam using a double-side adhesive tape or an adhesive agent, but it is preferably integrated with the polymer foam by self-adhesion. If it is self-adhered, the magnetic resin does not peel off from the polymer foam easily and shows excellent durability. Since the magnetic resin is flexible, the magnetic resin-containing polymer foam is soft and shows good sitting comfort.

When the magnetic resin is made of polyurethane elastomer, the magnetic resin generally preferably has an NCO index of 0.35 to 1.15, more preferably 0.4 to 1.1. If NCO index is less than 0.35, the magnetic elastomer tends not to cure sufficiently. If NCO index is more than 1.15, the elastic modulus tends to become high and the detection accuracy tends to be lowered. As mentioned above, the control of elastic modulus of the magnetic resin can be carried out by controlling an amount of the crosslinking agent. When the magnetic resin is made of polyurethane elastomer, the elastic modulus of the magnetic resin can be controlled by NCO index. When the elastic modulus of the magnetic resin is controlled by NCO index, NCO index can be controlled in lower ranges, i.e. 0.35 to 0.7, preferably 0.4 to 0.65. The control of elastic modulus of the magnetic resin can be carried out by either use of mono-ol or control of NCO index, or it may be conducted by a combination of the both.

The magnetic resin may be non-foamed and does not have any foamed cell, but the magnetic resin may be foamed and has foamed cells, in view of stability, enhanced detection accuracy of the magnetic sensor and weight reduction. A foamed body can be a foamed resin, but a thermosetting resin foam is preferred because of physical properties, such as compression set and the like. The thermosetting resin foam can be polyurethane resin foam, silicone resin foam and the like, but polyurethane resin foam is more preferred. The polyurethane resin foam can be obtained from the isocyanate component and active hydrogen-containing compound as mentioned above.

In the present invention, a peripheral portion of the magnetic resin may be sealed by a sealing material as far as it does not deteriorate the flexibility of the magnetic resin. When the magnetic resin is sealed by the sealing material, it is not possible to control an average cell diameter of the magnetic resin by the use of high polar mono-ol component or by the other method, but it can be possible to control an average cell diameter by an adjustment of thickness or the like. The sealing material can be thermoplastic resin, thermosetting resin or a mixture thereof. The thermoplastic resin includes styrene based thermoplastic elastomer, polyolefin based thermoplastic elastomer, polyurethane based thermoplastic elastomer, polyester based thermoplastic elastomer, polyamide based thermoplastic elastomer, polybutadiene based thermoplastic elastomer, polyisoprene based thermoplastic elastomer, fluoride based thermoplastic elastomer, ethylene ethylacrylate copolymer, ethylene vinylacetate copolymer, polyvinylchloride, polyvinylidene chloride, chlorinated polyethylene, fluoride resin, polyamide, polyethylene, polypropylene, polyethylene terephthalate, polybutylene terephthalate, polystyrene, polybutadiene or the like. The thermosetting resin includes, for example, diene based synthetic rubber, such as polyisoprene rubber, polybutadine rubber, styrene-butadiene rubber, polychloroprene rubber and acrylonitrile butadiene rubber; non-diene based rubber, such as ethylene-propylene rubber, ethylene-propylene-diene rubber, butyl rubber, acryl rubber, polyurethane rubber, fluororubber, silicone rubber and epichlorohydrine rubber; natural rubber; polyurethane resin; silicone resin; epoxy resin; or the like. When the sealing material is thermoplastic resin, thermosetting resin or a mixture thereof, it can be used in the form of film. The film can be a laminated film, a metal foil (e.g. aluminum foil) or a film having vapor deposited film composed of a film on which a metal is vapor deposited. The sealing material has technical effects that inhibit the formation of rust of the magnetic filler in the magnetic resin.

Process for Producing the Deformation Detection Sensor

The present invention also provides a method for producing a deformation detection sensor, which comprises the steps of a step of dispersing a magnetic filler in a polyurethane resin precursor comprising a mono-ol component, a step of curing the resin precursor to form a magnetic resin having an elastic modulus of 0.1 to 1.0 MPa, a step of placing the magnetic resin in a mold for a polymer foam, a step of pouring a polyurethane raw material of the polymer foam into the mold to foam, whereby the magnetic resin is integrated with the polymer foam, and a step of combining the magnetic resin-containing polymer foam with a magnetic sensor that detects a magnetic change caused by a deformation of the magnetic resin-containing polymer foam.

The magnetic resin can be controlled within the range of an elastic modulus of 0.1 to 10 MPa, by mixing the magnetic filler in a polyurethane resin precursor containing a mono-ol component to react in a container, when the resin is formed, Next, the obtained magnetic resin having a desired elastic modulus is placed in a mold for the polymer foam into which a raw material for the polyurethane polymer foam is poured, to integrate the magnetic resin with the polymer foam. When the magnetic resin is placed in the mold for the polymer foam, the placement of the magnetic resin is easily conducted by using magnetism attracting a magnetized material, for example a magnet is preliminary put in the mold and attracts the magnetic resin. The magnet may be preliminary placed in a place where the magnetic resin is disposed, or the placement may be carried out by operating the strong magnetic outside the mold to a place where the magnetic resin is disposed. The placement of the magnetic resin may also be conducted by using a double side adhesive tape or an adhesive agent to adhere the magnetic resin therewith, in addition to the use of the magnet.

Polymer Foam

In the present invention, it is characterized that an average cell diameter of cells of a center portion of the polymer foam is smaller than that of cells of the polymer foam in the vicinity of an interface between the magnetic resin and the polymer foam, thus an average cell diameter in the vicinity of the interface of the magnetic resin being larger than the other portions. The difference of average cell diameters makes it possible to produce a deformation detection sensor which can detect a deformation even when a smaller pressure is applied. The average cell diameter where they are present in the vicinity of the magnetic resin can be determined by cutting the polymer foam along with the interface at the position of about 1 mm apart from an interface between the magnetic resin and the polymer foam, observing a cut surface with a scanning electron microscope (SEM; available from Hitachi Science Systems Co., Ltd. as S-3500N) with a magnification of 50 times to obtain an image, of which cell diameters in a desired area are then determined by an image analysis software (WinROOF available from Mitani Shouji Co., Ltd.) to obtain an average cell diameter of the polymer foam. An average cell diameter around a center portion of the polymer foam is determined by cutting the polymer foam along with the magnetic resin at the position of about 5 cm apart from an interface between the magnetic resin and the polymer foam and treating it same as mentioned in the determination of the average cell diameter in the vicinity of the magnetic resin.

It is considered that the difference of the average cell diameters as mentioned above can be caused by mixing high polar mono-ol with the raw material of the magnetic resin, when it is prepared, to enhance polarity of the magnetic resin obtained and to adsorb water which makes cell diameters larger near the vicinity of the magnetic resin.

The average cell diameter can suitably be within the range of 400 to 700 µm, preferably 400 to 600 µm in the vicinity of the magnetic resin of the polymer foam and within the range of 300 to 450 µm, preferably 330 to 400 µm in a center portion of the polymer foam a difference of the average cell diameter between the vicinity and the center portion being within the range of 30 to 300 µm, preferably 50 to 250 µm.

The polymer foam can be obtained by foaming a raw solution of the polymer foam. The polymer foam can be a general resin foam and among them thermosetting resin foam, such as polyurethane resin foam or silicone resin foam, is preferred. In the case of polyurethane resin foam, the raw solution generally comprises a polyisocyanate component, a polyol and an active hydrogen-containing compound such as water. The polyisocyanate component and active hydrogen-containing compound are listed hereinafter.

The polyisocyanate component can be anyone that has been used in the field of polyurethane. Examples of the polyisocyanate components are an aromatic diisocyanate, such as 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, 1,5-naphthalene diisocyanate, p-phenylene diisocyanate, m-phenylene diisocyanate, p-xylylene diisocyanate, m-xylylene diisocyanate and the like. It can also be polynuclear compounds of diphenylmethane diisocyanate (crude MDI). The polyisocyanate compound can further be an aliphatic diisocyanate, such as ethylene diisocyanate, 2,2,4-trimethylhexamethylene diisocyanate and 1,6-hexamethylene diisocyanate; an alicyclic diisocyanate, such as 1,4-cyclohexane diisocyanate, 4,4'-dicyclohexylmethane diisocyanate, isophorone diisocyanate, norbornane diisocyanate; and the like. These can be used alone or in combination with two or more isocyanates thereof. In addition, the isocyanate can be modified by urethane modification, allophanate modification, biuret modification, isocyanulate modification or the like.

The active hydrogen-containing compound can be anyone that has generally been used in the field of polyurethane. Examples of the active hydrogen-containing compounds are a polyether polyol, such as polytetramethylene ether glycol, polypropylene glycol, polyethylene glycol and a copolymer of propylene oxide and ethylene oxide; a polyester polyol, such as polybutylene adipate, polyethylene adipate, and 3-methyl-1,5-pentane adipate; a polyester polycarbonate such as a reaction product of polyester glycol (e.g. polycaprolactone polyol or polycaprolactone) and alkylene carbonate; a polyester polycarbonate polyol obtained by reacting polyethylene carbonate with a polyhydric alcohol to form a reaction mixture, followed by reacting the reaction mixture with an organic dicarboxylic acid; a polycarbonate polyol obtained by ester-exchange reacting a polyhydroxyl compound with an aryl carbonate; and the like. The active hydrogen-containing compounds can be used alone or a combination of two or more compounds thereof. The concrete examples of the active hydrogen-containing compounds include, for example EP 3028, EP 3033, EP 828, POP 3128, POP 3428 and POP 3628, commercially available from Mitsui Chemical Inc.; and the like.

When producing the polymer foam, other components, such as crosslinking agent, foam stabilizer, catalyst and the like can be employed and they are not limited thereto.

The crosslinking agent may include triethanolamine, diethanolamine or the like. The foam stabilizer may include SF-2962, SRX-274C, 2969T and the like, available from Dow Corning Toray Co., Ltd. Examples of the catalysts are Dabco 33LV available from Air Products Japan Co., Ltd., Toyocat ET, SPF2, MR available from Tosoh Corporation, and like.

In addition, an additive, such as water, toner, flame retardant or the like can be suitably employed if necessary.

Examples of the flame retardants are CR 530 or CR 505 available from Daihachi Chemical Industry Co., Ltd.

Deformation Detection Sensor

The magnetic resin-containing polymer foam as obtained above can be combined with the magnetic sensor to obtain the deformation detection sensor. In the deformation detection sensor, the magnetic resin-containing polymer foam is deformed by a person sitting on the seat to change magnetism. The magnetic change is detected by the magnetic sensor to find the person sitting on the seat. In the present invention, since an elastic modulus of the magnetic resin is low, the magnetic resin can be easily followed with the deformation of the polymer foam and deformed largely, so that detection sensitivity is enhanced. The low elastic modulus also increases stability or durability.

In the producing method of the deformation detection sensor of the present invention, the magnetic resin can be present either an upper surface of the polymer foam or a lower surface of the polymer foam. The magnetic resin may also be present in or inside the polymer foam.

The magnetic sensor can be anyone that has generally been used for detecting magnetism. It may include a magnetoresistive element (e.g. a semiconductor magnetoresistive element, an anisotropic magnetoresistive element (AMR), a gigantic magnetoresistive element (GMR) or a tunnel magnetoresistive element (RMR)), a hall element, an inductor, an MI element, a flux gate sensor and the like. The hall element, is preferred because it has excellent sensitivity widely or extensively.

In addition, the deformation detection sensor of the present invention can be used for different applications other than cushion pads for vehicles, such as a hand or a skin of a robot, a surface pressure distribution of a bed or the like, a road surface condition or an air pressure of a tire, an exercise condition of a living body (such as motion captures, respiratory conditions, relaxed states of muscle, and the like), an invasion into a keep-out area, a foreign object of a slide door.

EXAMPLES

The present invention is further explained based on the following examples which, however, are not construed as limiting the present invention to their details.

Example 1

Preparation of Magnetic Resin

A reaction vessel was charged with 42.6 parts by weight of polyol A (a polyester polyol obtained from 3-methyl-1,5-pentanediol, trimethylolpropane and adipic acid, OH value 56, Functionality 3; F-3010 available from Kuraray Co, Ltd.) and 42.6 parts by weight of polyol B (3-methyl-1,5-pentanediol adipate, OH value 56, Functionality 2, P-2010 available from Kuraray Co., Ltd.) and was dehydrated at a reduced pressure with mixing for one hour. The reaction vessel was then changed to nitrogen atmosphere. Next, 14.8 parts by weight of toluene diisocyanate (2,4 configuration=80%; available from Mitsui Chemicals Inc. as Cosrnonate T-80) was added to the reaction vessel and reacted for 3 hours at a temperature of 80° C. in the reaction vessel to synthesize a prepolymer A having a terminal isocyanate group (NCO %=3.58%).

Separately, 30.0 parts by weight of toluene was mixed with a mixture of 15.0 parts by weight of polyol A, 5.0 parts by weight of ethylene cyanohydrin (available from Tokyo Chemical Co., Ltd.) and 0.12 parts by weight of di-n-butyltin dilaurate (available from Nacalai Tesque, Inc.), into which 360.0 parts by weight of neodymium based filler (NdFeB magnetic powder; available from Molycorp Magnequench Co., Ltd. as MOP-14-12; average particle size 15 μm) was added, to form a filler dispersion. Separately, 100 parts by weight of the prepolymer A was mixed with 30.0 parts by weight of toluene to prepare a prepolymer solution. The prepolymer solution was added to the filler dispersion mentioned above and mixed using a planetary centrifugal mixer (available from Thinky Corporation) and defoamed. The reaction solution was adjusted by a nip roller to a 1.5 mm thickness. It was then kept at 60° C. for 18 hours to cure to obtain a magnet filler dispersion resin. It was then magnetized at 2.0 T using a magnetizing apparatus available from Tamakawa Co., Ltd.) to obtain a magnetic resin. An elastic modulus of the resulting magnetic resin was determined as generally described hereinafter and the results are shown in Table 1 Table 1 also indicates an NCO index upon production and a mon-ol content of the magnetic resin.

Elastic Modulus

An elastic modulus of the magnetic resin was determined as follow: A compression test was conducted at a compression speed of 1 mm/min at room temperature according to J18 K-7312, using Authograph AG-X (available from Shimadzu Corporation). A test strip was a sample having a cylindrical shape with a thickness of 12.5 mm and a diameter of 29.0 mm. A compression elastic modulus was calculated from a stress value at a compression of from 2.4% to 2.6%.

Preparation of Magnetic Resin-Containing Polymer Foam

Next, 60.0 parts by weight of a polypropylene glycol (available from Mitsui Chemicals Inc. as EP-3028; OH value 28), 40.0 parts by weight of a polymer polyol (available from Mitsui Chemicals Inc. as POP-3198; OH value 28), 2.0 parts by weight of diethanolamine (available from Mitsui Chemicals Inc.), 3.0 parts by weight of water, 1.0 part by weight of a foam stabilizer (available from Dow Corning Toray Co., Ltd. as SF-2962) and 0.5 parts by weight of an amine catalyst (available from Air Products Japan Co., Ltd. as Dabco 33LV) were mixed with stirring to obtain a mixture A which vas controlled to a temperature of 23° C. Separately, a mixture of toluene diisocyanate and crude MDI (80/20 weight ratio; available from Mitsui Chemicals Inc. as TM-90; NCO %=44.8%) was controlled to a temperature of 23° C. to obtain a mixture B.

The magnetic resin obtained above was cut to 50 mmφ and was placed on a desired position in a cavity of a square of 400 mm and a thickness of 70 mm in a mold and heated to a mold temperature of 62° C. Into the mold, a raw material obtained by mixing the mixture A with the mixture B so as to become NCO index=1.0 was poured using a high pressure foaming machine and foamed and cured at a mold temperature 62° C. for 5 minutes to obtain a magnetic resin-containing polymer foam. The polymer foam was subjected to a determination of an average cell diameter near the interface between the magnetic resin and the polymer foam, an average cell diameter at a center portion thereof, a difference of the average cell diameters, a change of average magnetic flux density (Gauss), property stability (%) and a foreign object sensation as explained hereinafter. The results are shown in Table 1.

Average Cell Diameter

A cross section at the vicinity (1 mm apart from an interface) of the magnetic resin in the polymer foam and a cross section at a center portion (5 cm apart from the interface) of the polymer foam, the interface being present between the magnetic resin and the polymer foam, were observed by a scanning electron microscope (SEM; available from Hitachi Science Systems Ltd. as S-3500N) with a magnification of 50 times to obtain an image, of which cell diameters in a desired area were then determined by an image analysis software (WinROOF available from Mitani Corporation) to obtain an average cell diameter of the polymer foam. A difference of the average cell diameters was also calculated by the following equation;

Difference of average cell diameters=(average cell diameter at vicinity of interface)−(average cell diameter at center portion)

Examples 2 to 5 and Comparative Example 1 to 2

A magnetic resin-containing polymer foam was prepared as generally described in Example 1, using the conditions of Table 1, and their elastic modulus, average cell diameter of the polymer foam, change of magnetic flux density, property stability and foreign object sensation were determined as generally described in Example 1, the results being shown in Table 1. Table 1 also shows NCO indexes and mono-ol contents of the magnetic resin.

TABLE 1

|  |  | Examples | | | | | Comparative Examples | |
|---|---|---|---|---|---|---|---|---|
|  |  | 1 | 2 | 3 | 4 | 5 | 1 | 2 |
| Prepolymer | A | 100.0 | 100.0 | 100.0 | 100.0 | 100.0 | 100.0 | 100.0 |
| Polyol | A | 15.0 | 6.8 | 41.4 | 84.9 | 213.0 | 284.0 | 71.0 |
|  | Ethylene cyanohydrin (mono-ol) | 5.0 | 5.6 | 3.1 | 2.6 | — | — | — |
| Solvent | Toluene | 60.0 | 56.2 | 72.3 | 187.5 | 156.5 | 192 | 85.5 |
|  | Neodymium based magnetic filler (MQP-14-12) | 360.0 | 337.2 | 433.5 | 562.5 | 939.0 | 1152 | 513 |
|  | Catalyst (n-butyltin dilaurate) | 0.12 | 0.11 | 0.14 | 0.19 | 0.31 | 0.38 | 0.17 |
|  | NCO index of magnetic resin | 1.00 | 1.00 | 1.00 | 0.70 | 0.40 | 0.30 | 1.20 |
|  | Mono-ol content of magnetic resin (meq/g) | 0.58 | 0.70 | 0.30 | 0.20 | — | — | — |
|  | Elastic modulus of magnetic rsin(MPa) | 0.48 | 0.16 | 9.52 | 4.21 | 0.64 | 0.02 | 16.72 |
| Average cell diameter | Interface | 482 | 586 | 438 | 462 | 428 | 466 | 440 |
| of polymer foam | Center portion | 354 | 365 | 371 | 383 | 369 | 372 | 348 |
| (μm) | Difference of average cell diameters | 128 | 221 | 67 | 79 | 59 | 94 | 92 |
|  | Magnetic flux density change (Gauss) | 3.6 | 4.5 | 1.7 | 2.1 | 2.6 | 1.6 | 0.5 |
|  | Property stability (%) | 4.5 | 5.2 | 3.7 | 4.4 | 4.2 | 10.2 | 6.6 |
|  | Foreign material sensation | ○ | ○ | ○~Δ | ○~Δ | ○ | ○ | x |

The results are shown in Table 1.

Average Magnetic Flux Density Change

A hall element (available from Asahi Kasei Microdevices Corporation as EQ-430L) was adhered to an acryl board and was then attached to a surface of the polymer foam opposite to the side of the magnetic resin in the obtained magnetic resin-containing polymer foam. A pressure indenter having 30 mmφ was applied to a center portion of the magnetic resin at a pressure of 5 kPa to obtain a change (Gauss) of magnetic flux density by an output voltage change of the hall element. The measurement of the change of the magnetic flux density was conducted 10 times and its average was calculated therefrom. It was conducted at a temperature of 20° C.

Property Stability

A distribution of the change of magnetic flux density was determined by the following equation. The results are shown as property stability (%) in Table 1.

$$\text{Property stability (\%)} = \frac{\sqrt{(\text{Measured magnetic flux density change} - \text{Average magnetic flux density change})^2}}{\text{Average magnetic flux density change}} \times 100$$

Foreign Object Sensation

An interface of the magnetic resin-containing polymer foam was pressed by a touch of a person and a foreign object sensation was evaluated by organoleptic evaluation.

○: No sensation of foreign object

Δ: Slightly presence of sensation of foreign object x: Presence of sensation of foreign object As is apparent from Table 1, the examples of the present invention are excellent in magnetic flux density change (Gauss), property stability and foreign object sensation. Example 2 shows an increased mono-ol content and a reduced elastic modulus. The average cell diameter in the vicinity of the magnetic resin in the polymer foam became increased. Accordingly, a magnetic flux density change increases, but the property stability slightly reduces. Example 3 shows an increased mono-ol content and a slightly high elastic modulus, the average cell diameter in the vicinity of the magnetic resin in the polymer foam being reduced. Accordingly, a magnetic flux density change decreases a little, and the property stability increases. Example 4 shows a reduced mono-ol content, but shows a slightly increased elastic modulus and a slightly smaller average cell diameter in the vicinity of the magnetic resin of the polymer foam, because of the effect of low NCO index (OH group). Accordingly, the magnetic flux density change decreases a little and the property stability increases. Example 5 did not use a mono-ol and reduced an elastic modulus by the effect of low NCO index. It shows an elastic modulus similar to Example 1, but shows a smaller average cell diameter in the vicinity of the magnetic resin in the polymer foam. Accordingly, the magnetic flux density change slightly decreases and the property stability increases. Comparative Example 1 reduced an elastic modulus because of low NCO index, but an elastic modulus was very small and a handling property was poor, thus easily crinkling in the obtained sample. Accordingly, it shows poor magnetic flux density change and poor stability. Comparative Example 2 increased an NCO index to make an elastic modulus increased, but an elastic modulus was too high and a magnetic flux density change was lowered and the property stability was also poor.

INDUSTRIAL APPLICABILITY

The deformation detection sensor of the present invention can be applied to a seat for vehicles and is excellent in durability so that it endures a long period of use. In addition, the deformation detection sensor of the present invention is excellent in stability.

REFERENCE SIGNS LIST

1 Sitting portion
2 Backrest portion
3 Magnetic sensor
4 Magnetic resin
5 Polymer foam
6 Magnetic resin-containing polymer foam
7 Outer skin
8 Pedestal

What is claimed is:

1. A deformation detection sensor which comprises:
   a magnetic resin-containing polymer foam which comprises a magnetic resin, in which a magnetic filler is contained, and a polymer foam in which the magnetic resin is included, and
   a magnetic sensor that detects a magnetic change caused by a deformation of the magnetic resin-containing polymer foam,
   wherein the magnetic resin has an elastic modulus of 0.1 to 10 MPa.

2. The deformation detection sensor according to claim 1, wherein an average cell diameter of cells of the polymer foam in the vicinity of an interface between the magnetic resin and the polymer foam is larger than that of cells of a center portion of the polymer foam.

3. The deformation detection sensor according to claim 1, wherein the magnetic resin and the polymer foam are made of polyurethane.

4. The deformation detection sensor according to claim 1, wherein the polyurethane which forms the magnetic resin comprises a mono-ol component.

5. The deformation detection sensor according to claim 4, wherein the mono-ol component is a high polar mono-ol.

6. The deformation detection sensor according to claim 4, wherein the mono-ol component is contained in an amount of 0.1 to 1.0 meq/g in the total of the polyurethane raw material.

7. The deformation detection sensor according to claim 1, wherein the magnetic resin and the polymer foam are adhered by self-adhesion.

8. The deformation detection sensor according to claim 1, wherein the magnetic resin-containing polymer foam is a cushion pad for a vehicle and the deformation to be detected occurs by a sitting of a person.

9. A method for producing a deformation detection sensor, comprising the steps of:
   a step of dispersing a magnetic filler in a polyurethane resin precursor comprising a mono-ol component,
   a step of curing the resin precursor to form a magnetic resin having an elastic modulus of 0.1 to 10 MPa,
   a step of placing the magnetic resin in a mold for a polymer foam,
   a step of pouring a polyurethane raw material of the polymer foam into the mold to foam, whereby the magnetic resin is integrated with the polymer foam, and
   a step of combining the magnetic resin-containing polymer foam with a magnetic sensor that detects a magnetic change caused by a deformation of the magnetic resin-containing polymer foam.

10. The method of producing the deformation detection sensor according to claim 9, wherein the mono-ol component is a high polar mono-ol.

11. The method of producing the deformation detection sensor according to claim 9, wherein the mono-ol component is contained in an amount of 0.1 to 1.0 meq/g in the total of the polyurethane raw material.

12. The method of producing the deformation detection sensor according to claim 9, wherein the magnetic resin and the polymer foam are adhered by self-adhesion.

* * * * *